US010302922B2

(12) United States Patent
McClelland et al.

(10) Patent No.: US 10,302,922 B2
(45) Date of Patent: May 28, 2019

(54) ILLUMINATION DEVICE FOR PROJECTING LIGHT IN A PREDETERMINED ILLUMINATION PATTERN ON A SURFACE

(71) Applicant: AGM Automotive, LLC, Wilmington, DE (US)

(72) Inventors: William McClelland, Waterford, MI (US); Kin Fong, Sterling Heights, MI (US); Steven Fileccia, Waterford, MI (US)

(73) Assignee: AGM Automotive, LLC, Wilmington, DE (US)

( * ) Notice: Subject to any disclaimer, the term of this patent is extended or adjusted under 35 U.S.C. 154(b) by 180 days.

(21) Appl. No.: 15/367,987

(22) Filed: Dec. 2, 2016

(65) Prior Publication Data

US 2017/0158120 A1 Jun. 8, 2017

Related U.S. Application Data

(60) Provisional application No. 62/263,135, filed on Dec. 4, 2015.

(51) Int. Cl.
| | |
|---|---|
| B60Q 3/20 | (2017.01) |
| F21V 5/04 | (2006.01) |
| F21V 14/00 | (2018.01) |
| F21V 15/01 | (2006.01) |
| F21V 19/00 | (2006.01) |
| G02B 19/00 | (2006.01) |

(Continued)

(52) U.S. Cl.
CPC ............ *G02B 19/0009* (2013.01); *B60Q 3/20* (2017.02); *F21V 5/04* (2013.01); *F21V 14/00* (2013.01); *F21V 15/01* (2013.01); *F21V 19/003* (2013.01); *G02B 27/30* (2013.01); *F21Y 2115/00* (2016.08)

(58) Field of Classification Search
CPC ...... G02B 19/0009; G02B 27/30; B60Q 3/20; F21V 5/04; F21V 14/00; F21V 15/01; F21V 19/003; F21Y 2115/00
See application file for complete search history.

(56) References Cited

U.S. PATENT DOCUMENTS

| 4,217,040 A * | 8/1980 | Longerbeam ........... A63J 17/00 353/46 |
| 4,690,515 A | 9/1987 | Nakajima et al. |

(Continued)

FOREIGN PATENT DOCUMENTS

JP 2001350073 A 12/2001

*Primary Examiner* — Mary Ellen Bowman
(74) *Attorney, Agent, or Firm* — Volpe and Koenig, P.C.

(57) ABSTRACT

An illumination device projects light in a predetermined illumination pattern on a surface. The illumination device includes a housing having a cavity and an aperture that opens into the cavity. The illumination device further includes a light module operatively attached to the housing for selectively emitting the light into the cavity. Furthermore, the illumination device includes a digital light panel at least partially disposed in the cavity between the light module and the aperture. The digital light panel has at least one opening defining a base pattern configuration corresponding to the predetermined illumination pattern for aligning the light emitted from the light module through the opening into the base pattern configuration and subsequently projecting the light through the aperture onto the surface in the predetermined illumination pattern.

20 Claims, 8 Drawing Sheets

(51) Int. Cl.
*G02B 27/30* (2006.01)
*F21Y 115/00* (2016.01)

(56) References Cited

U.S. PATENT DOCUMENTS

| | | | |
|---|---|---|---|
| 6,461,000 B1 * | 10/2002 | Magarill | G02B 26/0875 |
| | | | 348/771 |
| 6,502,970 B1 | 1/2003 | Anderson et al. | |
| 6,685,347 B2 | 2/2004 | Grutze | |
| 8,922,388 B2 | 12/2014 | Nykerk | |
| 9,321,395 B2 | 4/2016 | Ammar et al. | |
| 2008/0285293 A1 | 11/2008 | Sato | |
| 2009/0013922 A1 | 1/2009 | Lin | |
| 2009/0052189 A1 * | 2/2009 | Kon | F21V 7/0091 |
| | | | 362/296.01 |
| 2011/0273671 A1 * | 11/2011 | Chu | G03B 21/14 |
| | | | 353/13 |
| 2014/0055252 A1 * | 2/2014 | Ascencio | B60Q 1/50 |
| | | | 340/425.5 |
| 2014/0191859 A1 * | 7/2014 | Koelsch | H02J 7/0047 |
| | | | 340/455 |
| 2016/0356450 A1 | 12/2016 | McClelland et al. | |

* cited by examiner

ILLUMINATION DEVICE FOR PROJECTING LIGHT IN A PREDETERMINED ILLUMINATION PATTERN ON A SURFACE

CROSS-REFERENCE TO RELATED APPLICATIONS

The present application claims priority to and all the benefits of U.S. Provisional Patent Application No. 62/263,135, filed on Dec. 4, 2015, which is hereby expressly incorporated herein by reference in its entirety.

BACKGROUND OF THE INVENTION

1. Field of Invention

The present invention relates, generally, to an illumination system and, more specifically, to an illumination device for projecting light in a predetermined illumination pattern on a surface.

2. Description of the Related Art

There is a desire within the automotive industry to provide for an illumination system for illuminating a surface within an interior of the vehicle. In particular, there is a desire to illuminate the surface with a particular pattern or design. Illumination of the interior surface with the particular pattern or design improves visibility within the interior proximate the illuminated surface in low-light situations and is considered aesthetically appealing to viewers of the illuminated surface. One solution in the industry involves an illumination system that includes a panel having the surface and a portion that is partially transparent with the partially transparent portion panel having the particular pattern or design. A plurality of illumination devices, such as light emitting diodes or optical fibers, is placed behind the panel such that the panel is between the illumination devices and the viewer. The illumination devices emit light that transmits through the partially transparent portion of the panel, which illuminates the surface of the partially transparent portion such that the viewer sees the illuminated pattern or design.

While these illumination systems known in the related art have generally performed well for their intended purpose, there remains a need in the art for an improved illumination system.

SUMMARY OF THE INVENTION

The present invention overcomes the disadvantages in the related art in an illumination device for projecting light in a predetermined illumination pattern on a surface. The illumination device includes a housing having a cavity and an aperture that opens into the cavity. The illumination device further includes a light module operatively attached to the housing for selectively emitting the light into the cavity. Furthermore, the illumination device includes a digital light panel at least partially disposed in the cavity between the light module and the aperture. The digital light panel has at least one opening defining a base pattern configuration corresponding to the predetermined illumination pattern for aligning the light emitted from the light module through the opening into the base pattern configuration and subsequently projecting the light through the aperture onto the surface in the predetermined illumination pattern.

In this way, the present invention reduces the cost of manufacturing illumination systems of a vehicle in that the light may be projected onto any surface and that the surface is not required to be a particular material having specific transparency properties. Furthermore, the present invention allows for the aftermarket application of the illumination device in that the illumination may be mounted to project the light onto the surface.

BRIEF DESCRIPTION OF THE DRAWINGS

Other objects, features, and advantages of the present invention will be readily appreciated as the same becomes better understood after reading the subsequent description taken in connection with the accompanying drawing wherein.

DETAILED DESCRIPTION OF THE INVENTION

Figure 1:
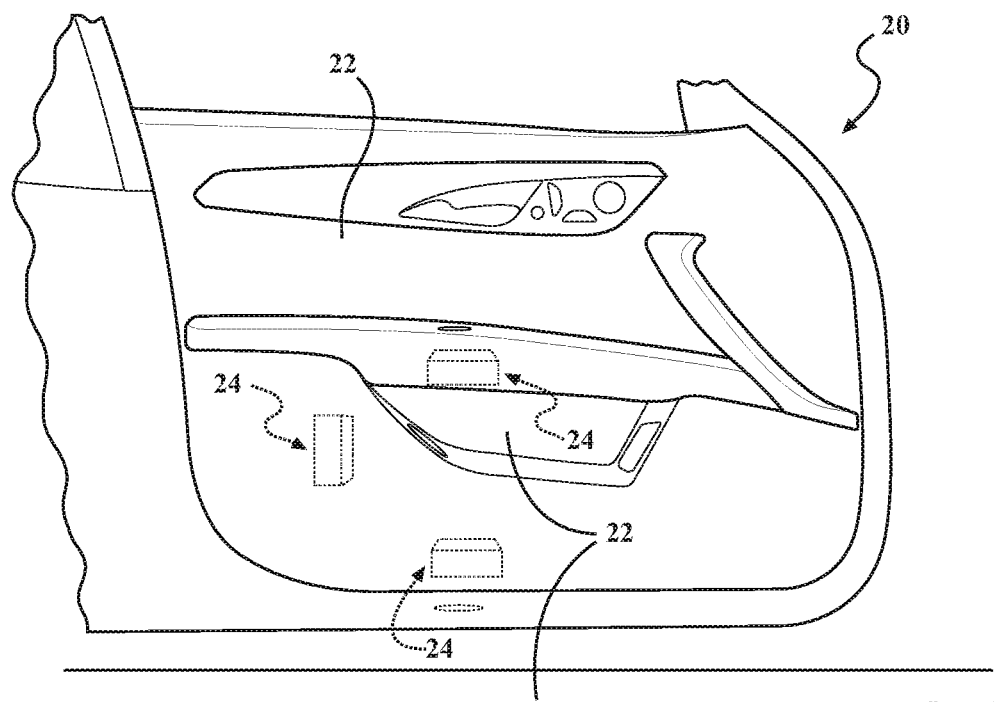
FIG. 1 is a perspective view of an illumination system having a surface and an illumination device.

Referring now to the drawings, where like numerals are used to designate like structure, an illumination system is illustrated at 20 in FIG. 1. The illumination system 20 may be adapted for use with a vehicle for transporting one or more occupants. However, it is to be appreciated that the illumination system 20 may be adapted for use in any system requiring illumination. The illumination system 20 includes a surface illustrated at 22 in FIG. 1. The surface 22 may be defined by a component within an interior of the vehicle, including but not limited to a door panel, a vehicle floor (such as on carpeting or on a floor mat in the passenger compartment or in a cargo area), and a vehicle ceiling. Furthermore, the surface 22 may be defined by any suitable component of an exterior of the vehicle, including, but not limited to, a body panel, a vehicle glass, and a wheel. It is to be appreciated that the surface 22 may be defined by any object proximate to the vehicle, such as the ground upon which the vehicle is disposed. It is also to be appreciated that the illumination system 20 may be a plurality of surfaces 22.

Figure 2A:
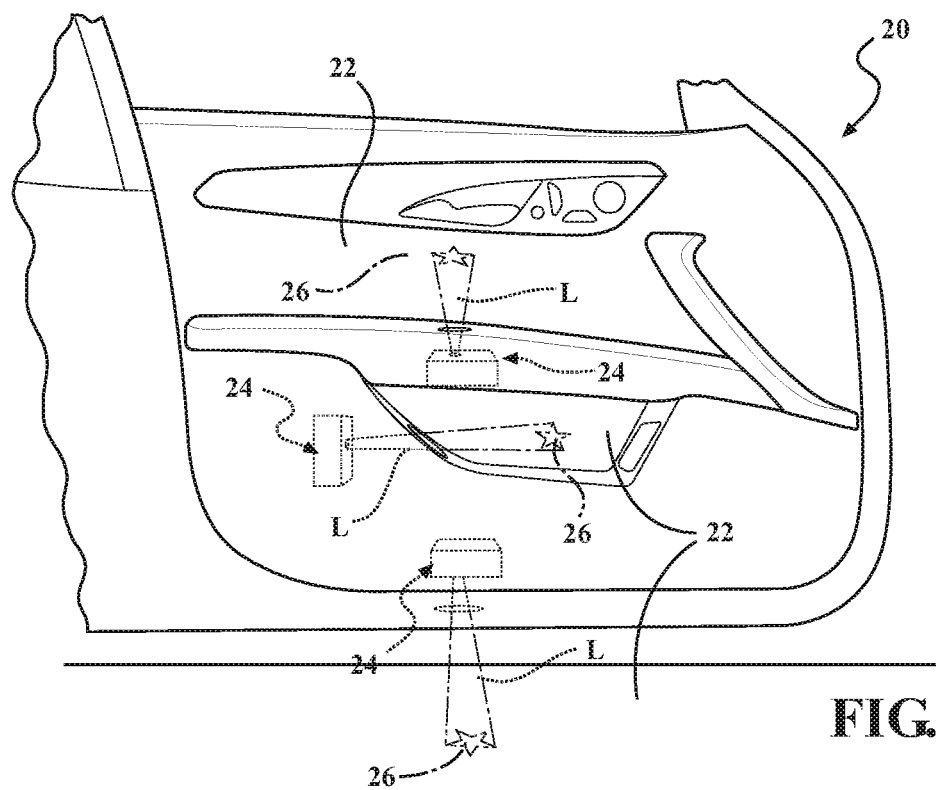
FIG. 2A is a perspective view of the illumination system with the illumination device projecting light onto the surface in a predetermined illumination pattern.
Figure 2B:
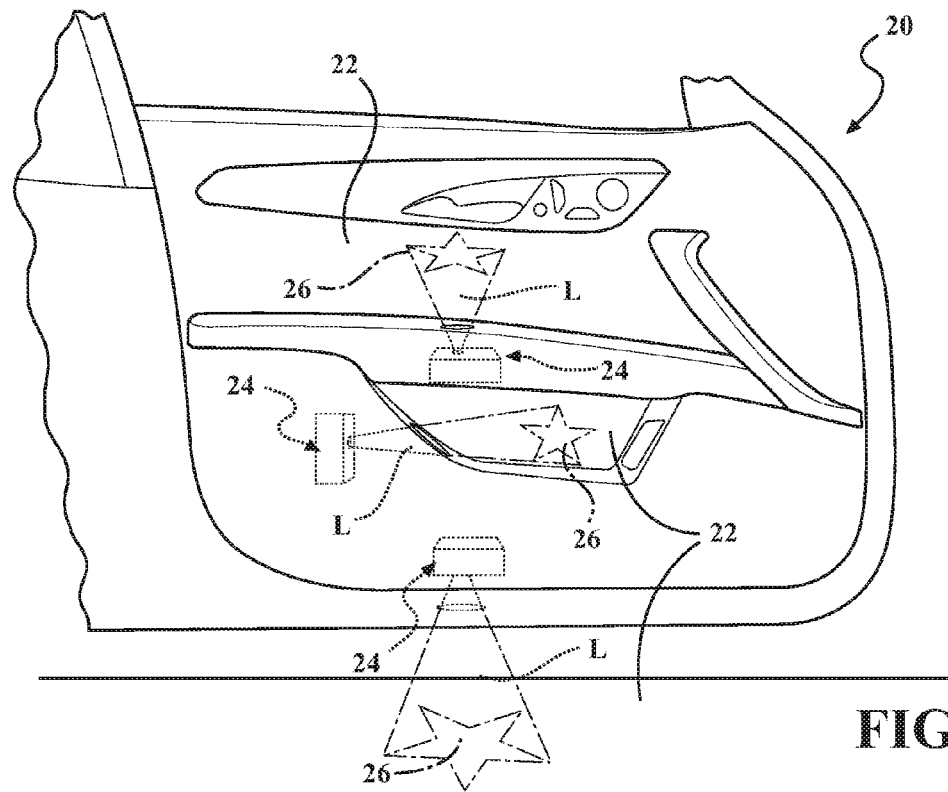
FIG. 2B is a perspective view of the illumination system with the illumination device projecting light onto the surface in another predetermined illumination pattern.

The illumination system 20 includes an illumination device 24, commonly referred to in the art as a shadow-lamp or a logo-lamp, for projecting light L in a predetermined illumination pattern 26 on the surface 22, as shown in FIGS. 2A and 2B. The predetermined illumination pattern 26 is shown as a star in FIGS. 2A and 2B for exemplary purposes. It is to be appreciated that the predetermined illumination pattern 26 may be any shape, logo, pattern, etc. and may be any configuration, orientation, etc., of the light L, including, but not limited to animated or dynamic images. As such, the predetermined illumination pattern 26 is contemplated when designing the illumination device 24, itself, as well as the position of the illumination device 24 relative to the surface 22. It is to be appreciated that the illumination device 24 may be a plurality of illumination devices 24 for projecting light L in the predetermined illumination pattern 26 on the surface 22 or on the plurality of surfaces 22 (which is illustrated in FIGS. 1-2B for demonstrative purposes only).

Figure 4:
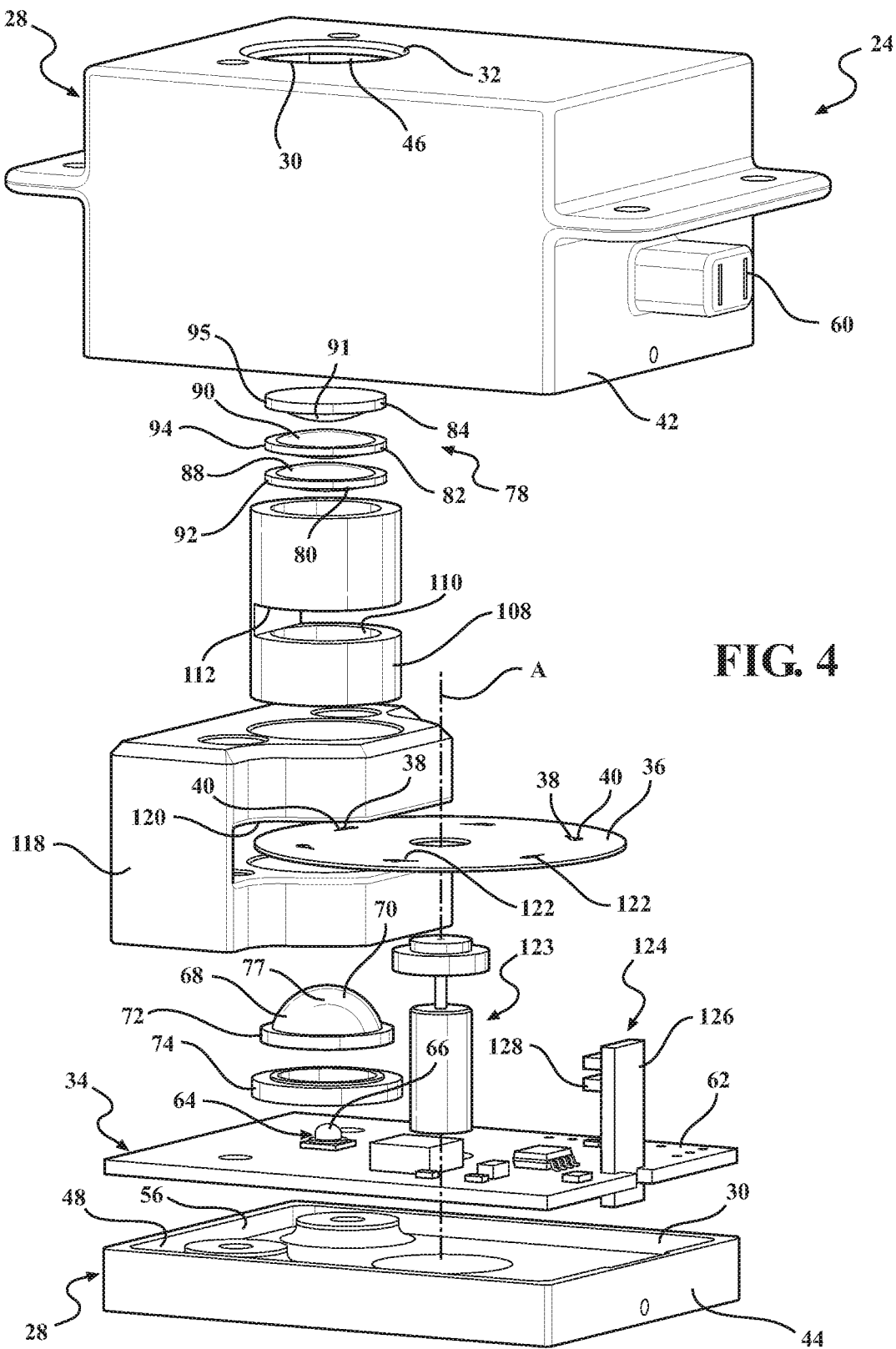
FIG. 4 is an exploded top perspective view of an illumination device showing a housing having first and second sections, a light module, a condensing lens, a digital light panel rotatable about an axis, and an objective lens arrangement.
Figure 8:
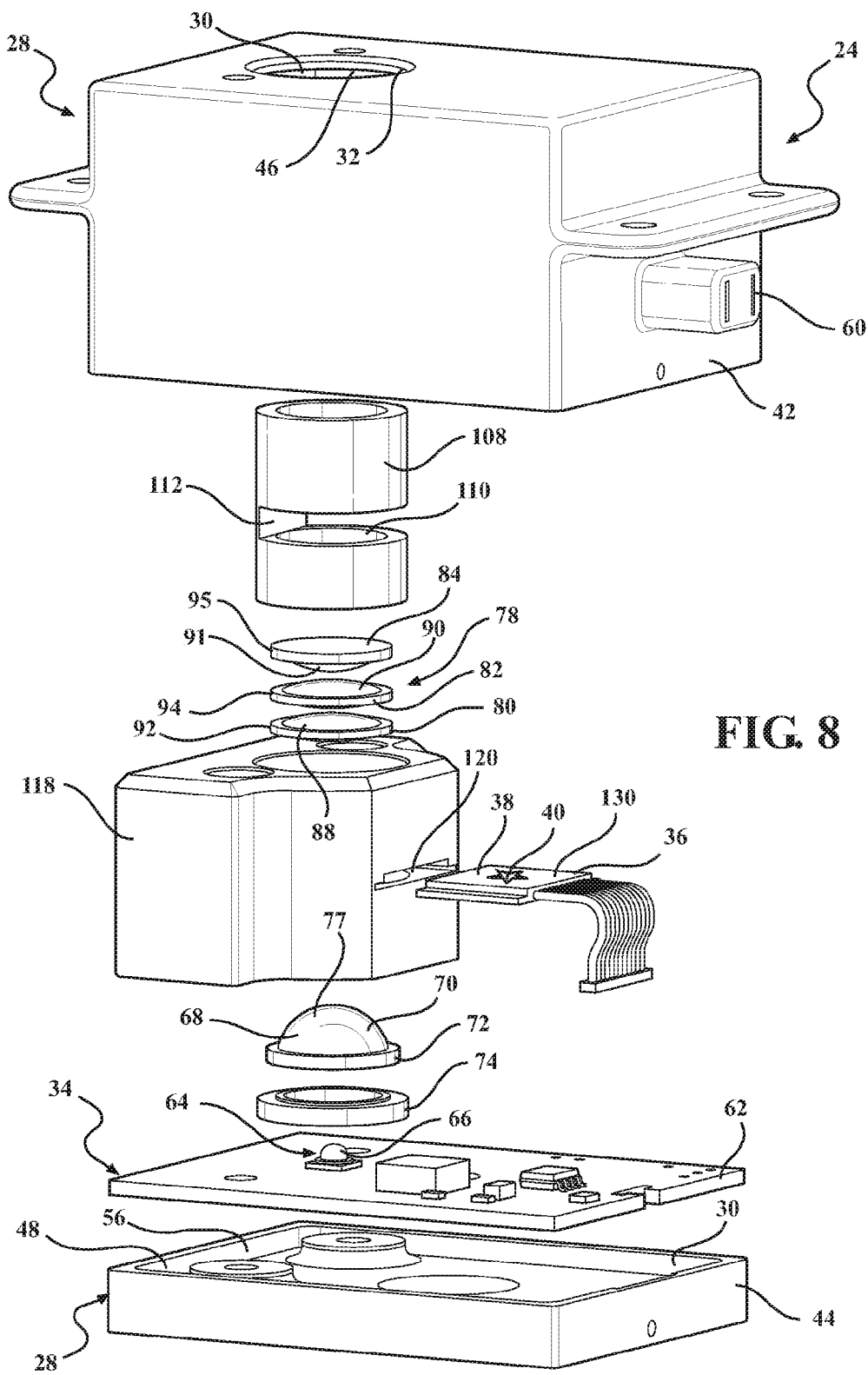
FIG. 8 is an exploded top perspective view of an illumination device showing a housing having first and second sections, a light module, a condensing lens, a digital light panel fixed to the housing, and an objective lens arrangement.

As shown in FIGS. 4 and 8, the illumination device 24 includes a housing 28 having a cavity 30 and an aperture 32 that opens into the cavity 30. The illumination device 24 further includes a light module 34 operatively attached to the housing 28 for selectively emitting the light L into the cavity 30. Furthermore, the illumination device 24 includes a digital light panel 36 at least partially disposed in the cavity 30 between the light module 34 and the aperture 32. The digital light panel 36 has at least one opening 38 defining a base pattern configuration 40 corresponding to the predetermined illumination pattern 26 for aligning the light L emitted from the light module 34 through the opening 38 into the base pattern configuration 40 and subsequently projecting the light L through the aperture 32 onto the surface 22 in the predetermined illumination pattern 26.

The opening 38 defining the base pattern configuration 40 of the digital light panel 36 may vary for animating the predetermined illumination pattern 26. Said differently, the opening 38 may progressively change in shape, size, orientation, etc., which correspondingly progressively changes the predetermined illumination pattern 26, which may be perceived by a person viewing the predetermined illumination pattern 26 as an animated or a dynamic image, as shown comparatively between FIGS. 2A and 2B. Returning to FIGS. 4 and 8, the light module 34 may emit the light L simultaneously with each variation of the opening 38 defining the base pattern configuration 40 to animate the predetermined illumination pattern 26. Said differently, the light L emitted from the light module 34 is timed to project through each variation of the opening 38 defining the base pattern configuration 40 which is projected onto the surface 22 in the predetermined illumination pattern 26 and viewed as an animated or a dynamic image. The varying of the opening 38 defining the base pattern configuration 40 for animating the predetermined illumination pattern 26 will be described in greater detail below.

As shown in FIGS. 4, 5, 8, and 9, the housing 28 may have a first section 42 and a second section 44 with the first section 42 having the aperture 32. The first and second sections 42, 44 cooperate to define the cavity 30. More specifically, the first section 42 defines a first portion 46 of the cavity 30 and the second section 44 defines a second portion 48 of the cavity 30.

Figure 3:
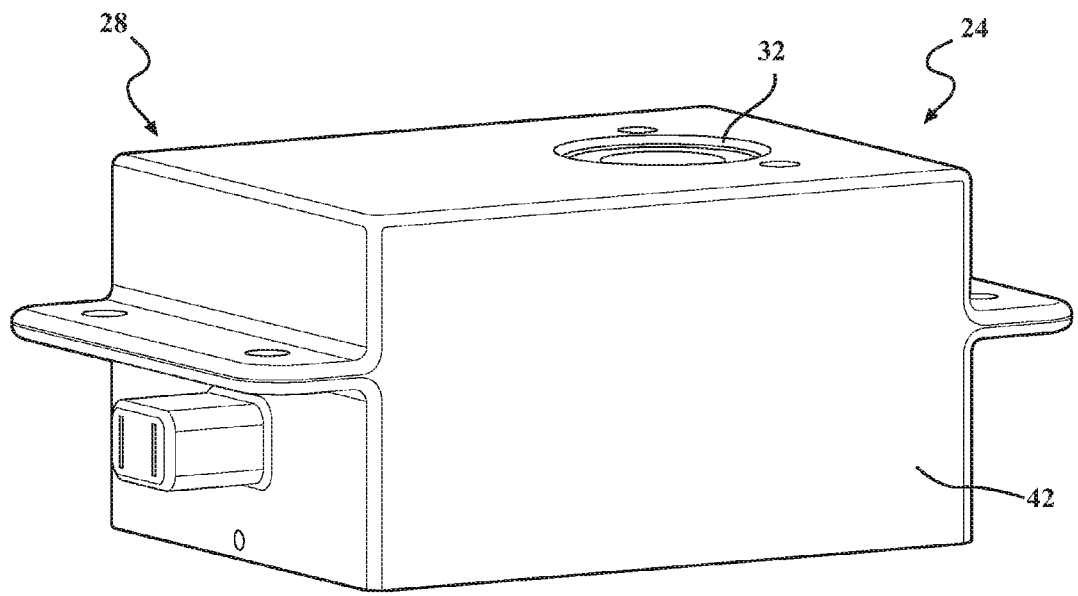
FIG. 3 is a perspective view of the illumination device.
Figure 5:
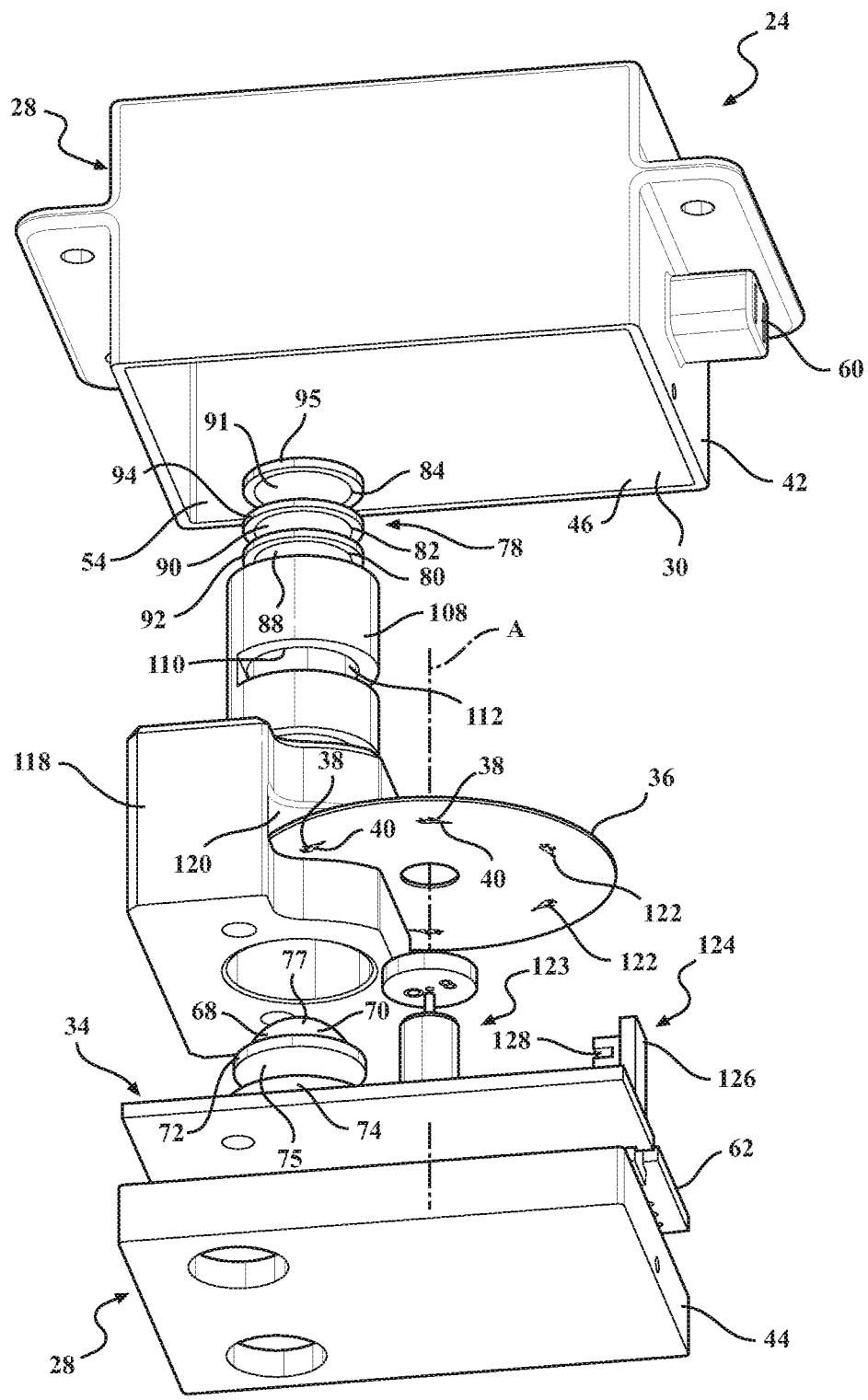
FIG. 5 is an exploded bottom perspective view of the illumination device shown in FIG. 4 showing the housing having the first and second sections, the light module, the condensing lens, the digital light panel rotatable about the axis, and the objective lens arrangement.
Figure 9:
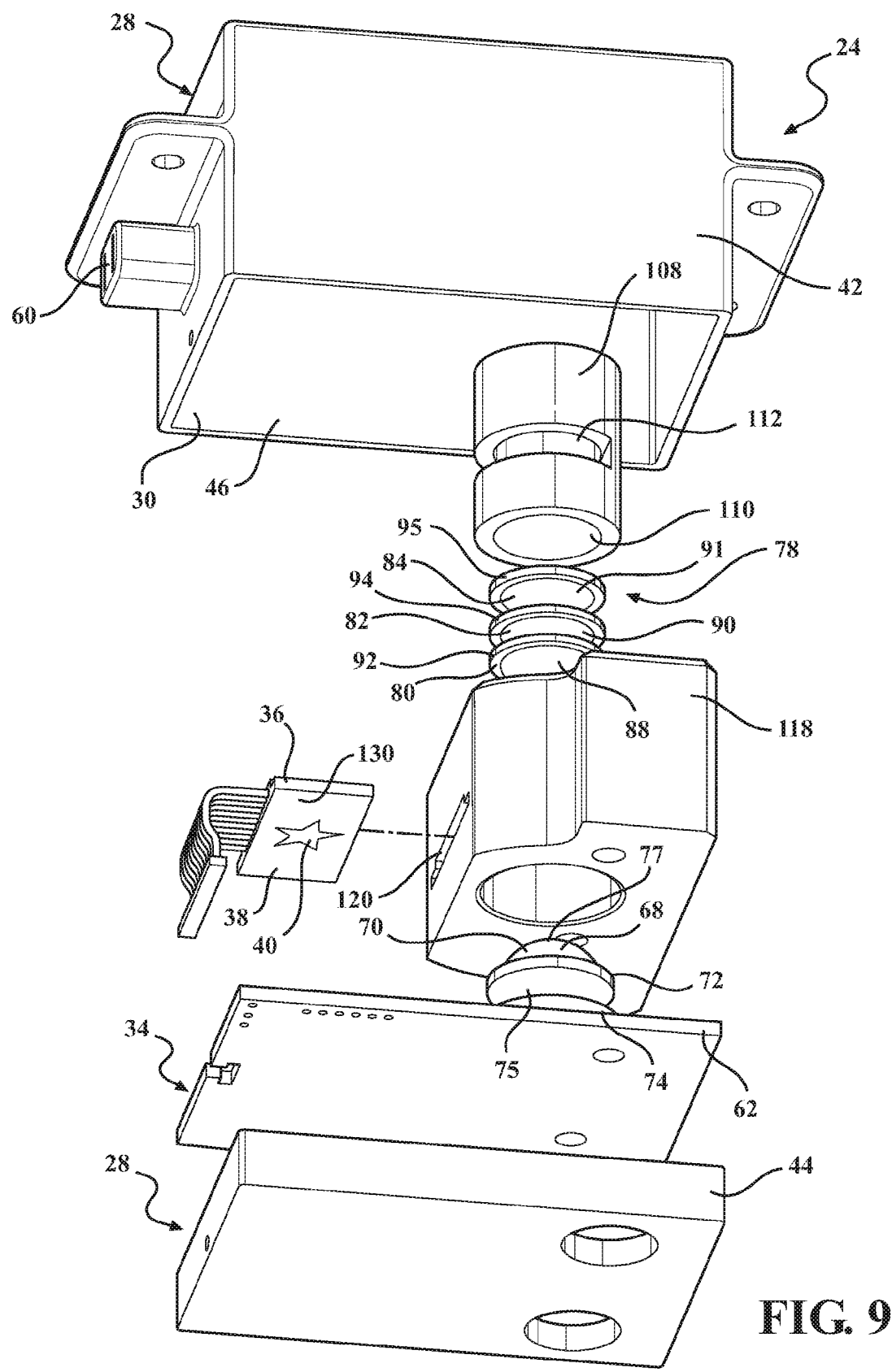
FIG. 9 is an exploded bottom perspective view of the illumination device shown in FIG. 8 showing the housing having the first and second sections, the light module, the condensing lens, the digital light panel fixed to the housing, and the objective lens arrangement.

As shown in FIG. 3, the first section 42 may have a substantially cuboidal configuration. Although not shown, the first section 42 may have a substantially cylindrical configuration. It is to be appreciated that the first section 42 may have any suitable shape. The first section 42 has the aperture 32, with the aperture 32 opening into the first portion 46 of the cavity 30. As shown in FIGS. 5 and 9, the first section 42 has an entrance opening 54 opposite the aperture 32 that opens into the first portion 46 of the cavity 30.

Referring now to FIGS. 4 and 8, the second section 44 may have a substantially cuboidal configuration. It is to be appreciated that the second section 44 may have any suitable shape. The second section 44 may have a first opening 56 adjacent the entrance opening 54 of the first section 42 for permitting interconnection of the first and second portions 46, 48 of the cavity 30. The one of the first and second sections 42, 44 may have a second opening 60 spaced from the first opening 56 for permitting electrical coupling with the light module 34. The second opening 60 may accept an electrical connector (which is not shown but is generally understood in the art). The electrical connector couples with the light module 34 to provide electricity to the light module 34.

The light module 34 may be supported by the second section 44 above the second portion 48 of the cavity 30 such that the light module 34 is disposed entirely within the first portion 46 of the cavity 30 as shown. Alternatively, the light module 34 may be at least partially disposed within each of the first and second portions 46, 48 of the first and second sections 42, 44, respectively, with the light module 34 extending through each of the entrance opening 54 of the first section 42 and the first opening 56 of the second section 44. It is to be appreciated that the light module 34 may be positioned anywhere within the cavity 30 of the housing 28.

As shown in FIGS. 4, 5, 8 and 9, the light module 34 may include a printed circuit board 62 supporting a light source 64 with the printed circuit board 62 coupled to the housing 28. The printed circuit board 62 may be supported by the second section 44 above the second portion 48 of the cavity 30 such that the printed circuit board 62 is disposed entirely within the first portion 46 of the cavity 30. Alternatively, the printed circuit board 62 may be disposed within the second portion 48 of the cavity 30 and mounted to the second section 44. The printed circuit board 62 selectively provides electricity to the light source 64 for selectively emitting the light L therefrom. Furthermore, the amount of current provided by the printed circuit board 62 may vary depending on the application. In one non-limiting example, the printed circuit board 62 may provide greater than zero milliamps (mA) of current and less than or equal to 50 mA of current when used in the interior of the vehicle. As another non-limiting example the printed circuit board 62 may provide greater than or equal to 350 mA of current and less than or equal to 700 mA of current.

As shown in FIGS. 4, 7, 8, and 11, the light module 34 may include a semi-conductor light source 66. More specifically, the light source 64 described above may be further defined as the semi-conductor light source 66. In one embodiment, the semi-conductor light source 66 is supported by and electrically coupled to the printed circuit board 62. As such, the semi-conductor light source 66 may extend from the printed circuit board 62 such that the semi-conductor light source 66 faces the aperture 32 for emitting the light L toward the aperture 32. It is to be appreciated that the semi-conductor light source 66 may be anywhere in the cavity 30.

The semi-conductor light source 66 may be further defined as a light emitting diode. Alternatively, the semi-conductor light source 66 may be further defined as a laser light source. In any embodiment, the semi-conductor light source 66 is capable of emitting any type of light. For example, the semi-conductor light source 66 may be capable of emitting visible light across the color spectrum. As another example, the semi-conductor light source 66 may also be capable of emitting non-visible light such as ultra-violet light which may illuminate a fluorescent material on the surface 22. It is to be appreciated that the semi-conductor light source 66 may be a single-color semi-conductor light source capable of emitting what is typically referred to as visible white light. It is also to be appreciated that the semi-conductor light source 66 may be a multi-color semi-conductor light source with the semi-conductor light source 66 capable of emitting specific colors of the visible spectrum of the light L. For example, the semi-conductor light source 66 may be a red-green-blue (RGB) L.E.D. capable of individually emitting visible red, green, and blue light, or in combination emitting colored light formed by the combination of at least two of the visible red, green, and blue light.

In addition, the semi-conductor light source 66 may be capable of emitting the light L in any direction. For example, the semi-conductor light source 66 may be a 60 degree semi-conductor light source as shown in FIGS. 4, 7, 8, and 11, with the semi-conductor light source 66 emitting the light L in a conical shape having an angle of 60 degrees between the outermost light L as measured along a plane extending through a center of the light L. It is to be appreciated that semi-conductor light source 66 may be a 120 degree semi-conductor light source. It is also to be appreciated that the semi-conductor light 66 source may emit the light L at any suitable angle.

In any embodiment, the semi-conductor light source 66 is capable of emitting the light L at any intensity. It will be appreciated that the semi-conductor light source 66 could be of any suitable type or configuration and could include any suitable number of semi-conductor light sources 66 without departing from the scope of the present invention.

As shown in FIGS. 4, 7, 8, and 11, the illumination device 24 may further include a condensing lens 68 disposed between the light module 34 and the digital light panel 36 for collimating the light L emitted from the light module 34 toward the digital light panel 36. The condensing lens 68 may have a central portion 70 having an at least partially circular configuration and a mounting body 72 disposed about a periphery of the central portion 70.

The illumination device 24 may further include a spacer 74 having an annular configuration and disposed between light module 34 and the condensing lens 68 for guiding the light L into the condensing lens 68. The spacer 74 is disposed about the light source 64 and extends toward and abutting the printed circuit board 62. The condensing lens 68 is supported by the spacer 74 above the printed circuit board 62. The light source 64 is disposed within the spacer 74 below the central portion 70. As such, the light L emitted from the light source 64 is partially retained by the spacer 74, the printed circuit board 62, and the central portion 70. At least the central portion 70 of the condensing lens 68 may be transparent such that the light L may pass through the central portion 70. The mounting body 72 may be opaque such that the light L may not pass through the mounting body 72.

The spacer 74 and the printed circuit board 62 redirect the light L emitted from the light source 64 toward the central portion 70 where the light L can pass therethrough. It is to be appreciated that the central portion 70 may have any suitable amount of transparency. Conversely, the central portion 70 may have any suitable amount of opaqueness. In one embodiment, the central portion 70 is in axial alignment with the light source 64 and the aperture 32. It is to be appreciated that the central portion 70 may be misaligned from the light source 64 and the aperture 32.

Figure 7:
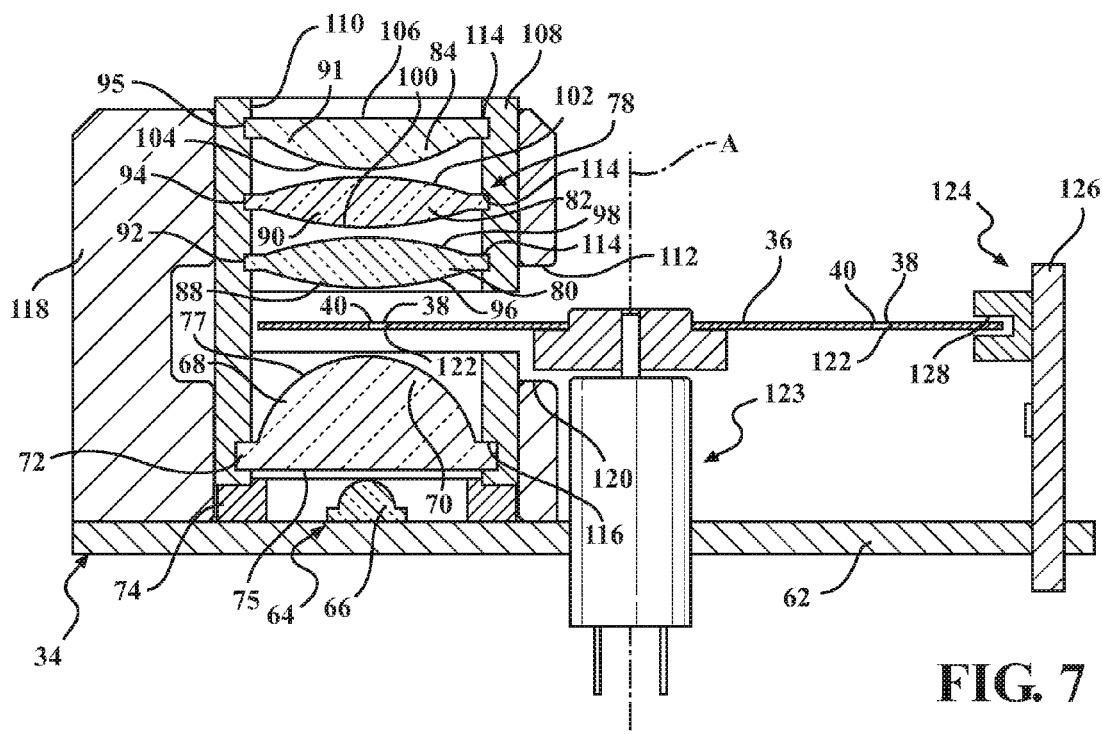
FIG. 7 is a cross-sectional view of the light module, the condensing lens, the digital light panel rotatable about the axis, and the objective lens arrangement shown in FIG. 4.
Figure 11:
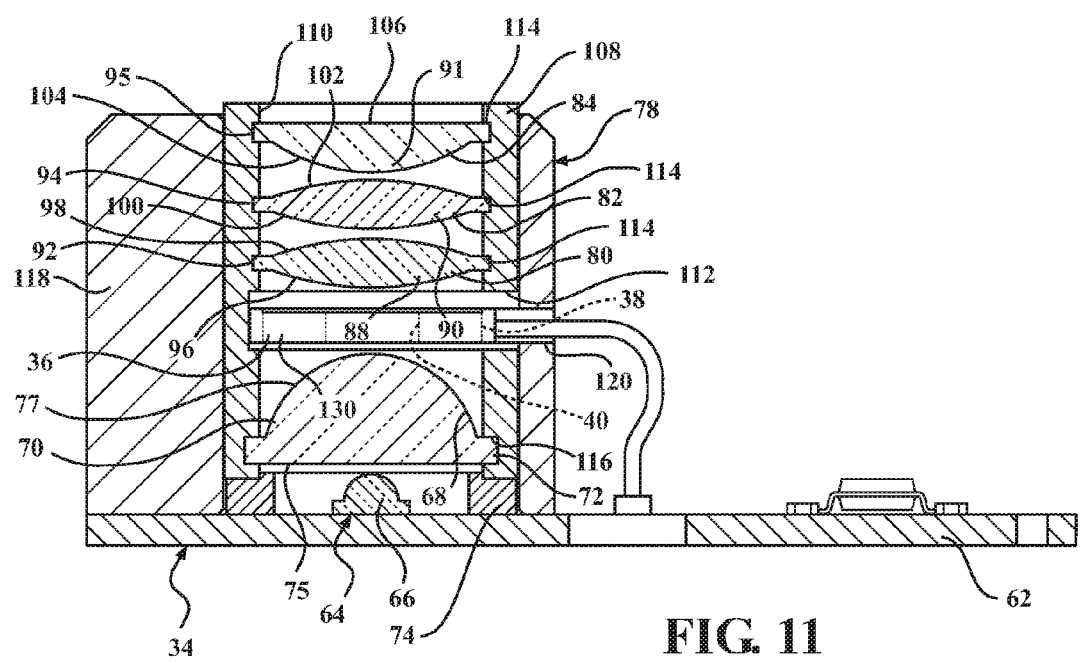
FIG. 11 is a cross-sectional view of the light module, the condensing lens, the digital light panel fixed to the housing, and the objective lens arrangement shown in FIG. 8.

The central portion 70 may have a partially convex configuration as shown in FIGS. 7 and 11. More specifically, the central portion 70 may have an entrance surface 75 and an exit surface 77 with the entrance surface 75 having a substantially planar configuration facing the light source 64 and the exit surface 77 having an arcuate configuration bowing outwardly toward the aperture 32. Alternatively, the central portion 70 may have a convex configuration with the entrance surface 75 bowing outwardly toward the light source 64 and the exit surface 77 bowing outwardly toward the aperture 32. It is to be appreciated that the condensing lens 68 may be any suitable configuration (such as a concave configuration), and may be any suitable distance from the semi-conductor light source 66 for collimating the light L.

The central portion 70 of the condensing lens 68 collimates the light L such that the light L emits from the light source 64 in random, transverse directions may be gathered in the central portion 70 of the condensing lens 68 and redirected into substantially parallel light L directed toward the aperture 32. For example, if the semi-conductor light source 66 is the 60 degree semi-conductor light source, the central portion 70 collimates the light L emitted in a 60 degree conical shape into a column of substantially parallel light L.

As shown in FIGS. 4, 7, 8, and 11, the illumination device 24 may further include an objective lens arrangement 78 disposed between the digital light panel 36 and the aperture 32 for transforming the light L from the base pattern configuration 40 into the predetermined illumination pattern 26. The objective lens arrangement 78 may perform any one of or any combination of the functions of repairing chromatic aberrations in the light L, inverting the light L from the base pattern configuration 40 to the predetermined illumination pattern 26, and focusing the base pattern configuration 40 into the predetermined illumination pattern 26 on the surface 22 having a specific size (i.e., the focal length). It is to be appreciated that the objective lens arrangement 78 may perform further functions not specifically described herein.

As shown in FIGS. 4, 7, 8, and 11, the objective lens arrangement 78 may include a first lens 80 and a second lens 82 with the first lens 80 disposed between the light module 34 and the second lens 82. As such, the second lens 82 is disposed between the first lens 80 and the aperture 32. The objective lens arrangement 78 may further include a third lens 84 disposed between the second lens 82 and the aperture 32. It is to be appreciated that the objective lens arrangement 78 may be comprised of any number of lenses.

In one embodiment, the light source 64, the condensing lens 68, the digital light panel 36, the first lens 80, the second lens 82, the third lens 84, and the aperture 32 are generally linearly aligned, as shown in FIGS. 7 and 11. The general linear alignment increases the efficiency of the illumination device 24 by facilitating a direct path for the light L from the emission of the light L at the light source 64 to the passage of the light L out of the cavity 30 of the housing 28 through the aperture 32. It is to be appreciated that these components may be misaligned.

Each of the first, second, and third lenses 80, 82, 84 may have a central body 88, 90, 91 and a mounting frame 92, 94, 95 radially disposed about the central body 88, 90, 91. As described above, the first, second, and third lenses 80, 82, 84 may be aligned with the light source 64, the condensing lens 68, the digital light panel 36, and the aperture 32. More specifically, the central body 88, 90, 91 of each of the first, second, and third lenses 80, 82, 84 may be aligned with the light source 64, the central portion 70 of the condensing lens 68, the digital light panel 36, and the aperture 32.

The mounting frame 92, 94, 95 may extend radially from the central body 88, 90, 91 of each the first, second, and third lenses 80, 82, 84. It is to be appreciated that the mounting frame 92, 94, 95 may extend in any suitable direction.

In one embodiment, at least the central body 88, 90, 91 of each of the first, second, and third lenses 80, 82, 84 is transparent such that the light L may pass through the central body 88, 90, 91. The mounting frame 92, 94, 95 of the first, second, and third lenses 80, 82, 84 may also be transparent. Alternatively, the mounting frame 92, 94, 95 of each of the first, second, and third lenses 80, 82, 84 may be opaque such that the light L may not pass through the mounting frame 92, 94, 95. As such, the mounting frame 92, 94, 95 of each of the first, second, and third lenses 80, 82, 84 redirect the light L emitted from the light source 64 toward the central body 88, 90, 91 of each of the first, second, and third lenses 80, 82, 84 where the light L can pass therethrough. It is to be appreciated that the central body 88, 90, 91 and the mounting frame 92, 94, 95 of each of the first, second, and third lenses 80, 82, 84 may have any suitable amount of transparency. Conversely, the central body 88, 90, 91 and the mounting frame 92, 94, 95 of each of the first, second, and third lenses 80, 82, 84 may have any suitable amount of opaqueness.

As shown in FIGS. 7 and 11, the first lens 80 may have first and second surfaces 96, 98 spaced from one another and the second lens 82 may have first and second surfaces 100, 102 spaced from one another with the first surface 96 of the first lens 80 facing the light module 34, the second surface 102 of the second lens 82 facing the aperture 32, and with the second surface 98 of the first lens 80 and the first surface 100 of the second lens 82 facing one another. Furthermore, the third lens 84 may have first and second surfaces 104, 106 spaced from one another with the first surface 104 of the third lens 84 facing the second surface 102 of the second lens 82 and the second surface 106 of the third lens 84 facing the aperture 32. The second surface 98 of the first lens 80 and the first surface 100 of the second lens 82 may be spaced from each other. The second surface 102 of the second lens 82 and the first surface 104 of the third lens 84 may be spaced from each other. It is to be appreciated that the second surface 98 of the first lens 80 may abut the first surface 100 of the second lens 82. Likewise, it is to be appreciated that the second surface 102 of the second lens 82 may abut the first surface 104 of the third lens 84.

As shown in FIGS. 7 and 11, each of the first and second surfaces 96, 98, 100, 102 of the first and second lenses 80, 82 may be curved. In one embodiment, each of the first and second surfaces 96, 98, 100, 102 of each of the first and second lenses 80, 82 is curved at the central body 88, 90 of each of the first and second lenses 80, 82. Each of the first and second surfaces 96, 98, 100, 102 of each of the first and second lenses 80, 82 may be substantially convex such that the first surfaces 96, 100 bow outwardly toward the light source 64 and the second surfaces 98, 102 bow outwardly toward the aperture 32. It is to be appreciated that any of the first and second surfaces 96, 98, 100, 102 of the first and second lenses 80, 82 may have a substantially concave configuration, a substantially planar configuration, or any other suitable configuration.

As shown in FIGS. 7 and 11, the first surface 104 of the third lens 84 may be curved and the second surface 106 of the third lens 84 may be substantially planar. Moreover, the first surface 104 of the third lens 84 may be substantially convex such that the first surface 104 bows outwardly toward the light source 64. It is to be appreciated that the first and second surfaces 104, 106 of the third lens 84 may have a substantially convex, substantially concave, substantially planar configuration, or any other suitable configuration.

As shown in FIGS. 7 and 11, the first and second surfaces 96, 98, 100, 102 of the first and second lenses 80, 82 and the first surface 104 of the third lens 84 may have substantially equal radii. It is to be appreciated that the radius of each of the first and second surfaces 96, 98, 100, 102 of the first and second lenses 80, 82 and the first surface 104 of the third lens 84 may be any suitable radius. Furthermore, it is to be appreciated that the first, second, and third lenses 80, 82, 84 may be configured in any way suitable for performing desired functions including, but not limited to, repairing chromatic aberrations in the light L, inverting the light L from the base pattern configuration 40 to the predetermined illumination pattern 26, and focusing the base pattern configuration 40 into the predetermined illumination pattern 26 on the surface 22 having a specific size. It is to be appreciated that the first and second surfaces 96, 98, 100, 102 of the first and second lenses 80, 82 and the first surface 104 of the third lens 84 may have any suitable size, shape, and configuration without escaping the scope of the present invention.

The condensing lens 68 and the first, second, and third lenses 80, 82, 84 may be comprised of polycarbonate. It is to be appreciated that the condensing lens 68 and the first, second, and third lenses 80, 82, 84 may be comprised of poly(methyl methacrylate) ("PMMA"), glass, silicone, or any other suitable material for allowing transmission of the light L therethrough. It is also to be appreciated that the condensing lens 68 and the first, second, and third lenses 80, 82, 84 may be individually comprised of varying material. In one embodiment, the condensing lens 68 and the first lens 80 comprise the same material. It is to be appreciated that certain materials, such as silicone, have properties conducive to light having an increased intensity, such as the light L emitted when used with the exterior of the vehicle.

As shown in FIGS. 4, 5, 8, and 9, the illumination device 24 may further include a frame 108 fixed to the housing 28 and having a bore 110 extending therethrough, with the bore 110 aligned with the aperture 32 and the light module 34 and the digital light panel 36 at least partially disposed within the bore 110. Furthermore, the bore 110 may be aligned with the light source 64, the condensing lens 68, and the objective lens arrangement 78.

The frame 108 may have a substantially cylindrical configuration as shown in FIGS. 4, 5, 8, and 9. It is to be appreciated that the frame 108 may have any suitable size, shape, and configuration.

As shown in FIGS. 7 and 11, the frame 108 may be aligned with and abutting the spacer 74. Said differently, the frame 108 and the spacer 74 may be stacked on one another. It is to be appreciated that the frame 108 may be spaced from the spacer 74. Furthermore, it is to be appreciated that the frame 108 may positioned in any suitable position relative to the spacer 74.

The frame 108 may have a slot 112 transverse to the bore 110 and opening into the bore 110 with the digital light panel 36 extending into the bore 110 through the slot 112. As shown in FIGS. 4, 5, 8, and 9, the slot 112 may have a substantially rectangular configuration. It is to be appreciated that the slot 112 may have any suitable configuration for accepting the digital light panel 36. The slot 112 may be longitudinally positioned transverse to the alignment of the aperture 32, the light module 34, and the digital light panel 36. It is to be appreciated that the slot 112 may be longitudinally positioned in any suitable orientation.

As shown in FIGS. 7 and 11, the objective lens arrangement 78 may be disposed within the bore 110 between the slot 112 and the aperture 32 and may be coupled to the frame 108 to fix the objective lens arrangement 78 to the housing 28. More specifically, the frame 108 may have a plurality of objective lens channels 114 having a substantially annular configuration, with each objective lens channel 114 independently accepting the mounting frame 92, 94, 95 of each of the first, second, and third lenses 80, 82, 84 therein. The disposition of the mounting frame 92, 94, 95 in the objective lens channel 114 prevents movement of the respective first, second, or third lenses 80, 82, 84 relative to the light source 64. As such, the objective lens channel 114 fixes the objective lens arrangement 78 to the housing 28 and maintains proper positioning of the objective lens arrangement 78 relative to the light source 64. It is to be appreciated that the opposite may be true, i.e., the first, second, and third lenses 80, 82, 84 may each have the objective lens channel 114 and the frame 108 may have the mounting frames 92, 94, 95. Furthermore, it is to be appreciated that the objective lens arrangement 78 may be coupled to the frame 108 through any suitable configuration.

The condensing lens 68 may be disposed within the bore 110 between the slot 112 and the light module 34 and may be coupled to the frame 108 to fix the condensing lens 68 to the housing 28. More specifically, the frame 108 may have a condensing lens channel 116 having a substantially annular configuration, with the condensing lens channel 116 accepting the mounting body 72 of the condensing lens 68 therein. The disposition of the mounting body 72 in the condensing lens channel 116 prevents movement of the condensing lens 68 relative to the light source 64. As such, the condensing lens channel 116 fixes the condensing lens 68 to the housing 28 and maintains proper positioning of the condensing lens 68 relative to the light source 64. It is to be appreciated that the opposite may be true, i.e., the condensing lens 68 may have the condensing lens channel 116 and the frame 108 may have the mounting body 72. Furthermore, it is to be appreciated that the condensing lens 68 may be coupled to the frame 108 through any suitable configuration.

Figure 6:
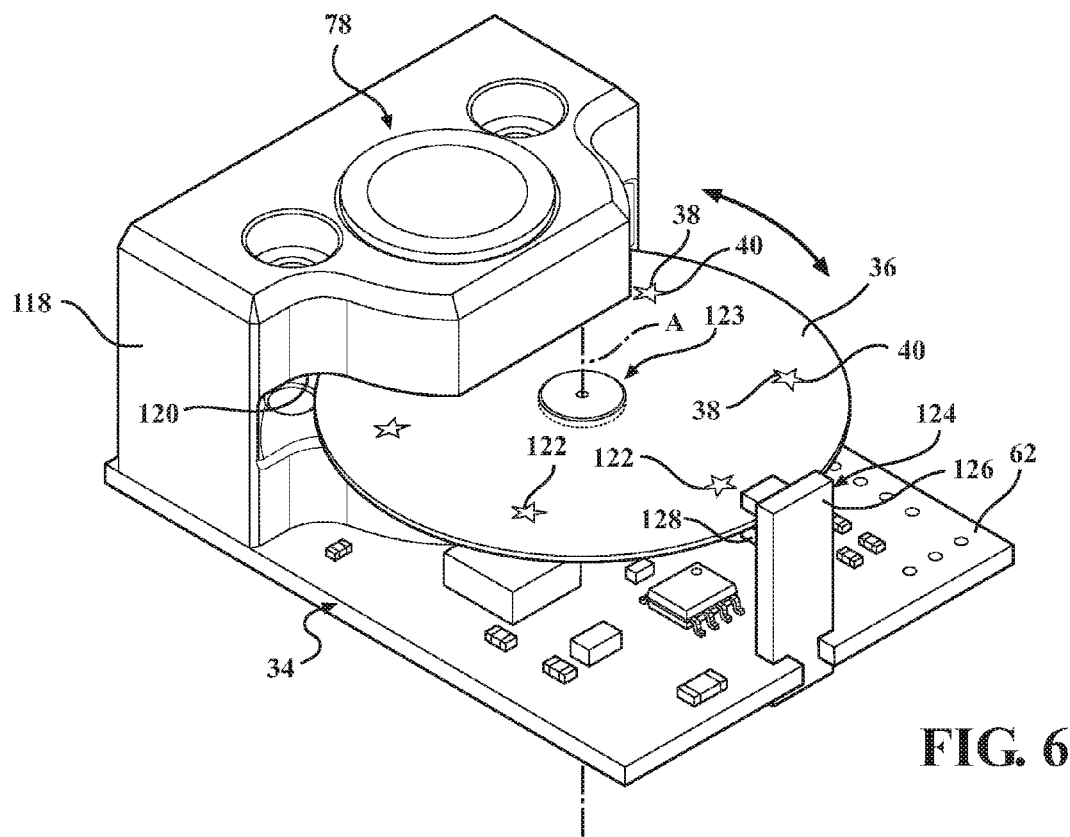
FIG. 6 is a perspective view of the light module, the condensing lens, the digital light panel rotatable about the axis, and the objective lens arrangement shown in FIG. 4.
Figure 10:
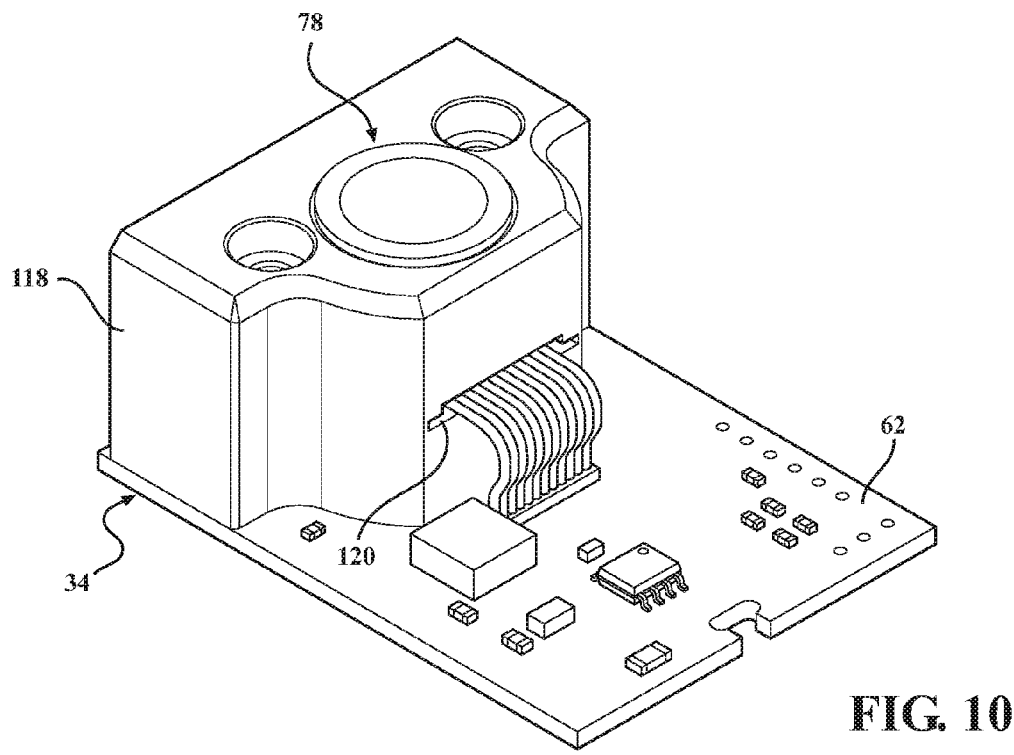
FIG. 10 is a perspective view of the light module, the condensing lens, the digital light panel fixed to the housing, and the objective lens arrangement shown in FIG. 8.

As shown in FIGS. 6 and 10, the illumination device 24 may further include a retainer 118. The retainer 118 may surround and frictionally engage the frame 108 to fix the frame 108 to the retainer 118. The retainer 118 may be fixed to the housing 28 to fix the frame 108 to the housing 28. As shown in FIGS. 4 and 8, the retainer 118 may have a void 120 aligned with the slot 112 of the frame 108 that permits extension of the digital light panel 36 through the void 120 and the slot 112 into the bore 110 of the frame 108. It is to be appreciated that the retainer 118 may have any suitable configuration to fix the frame 108 relative to the housing 28.

As shown in FIGS. 4 and 8, the digital light panel 36 may have a substantially thin and flat configuration parallel to the aperture 32. The digital light panel 36 may be positioned between the condensing lens 68 and the first lens 80. Furthermore, the digital light panel 36 may extend into the bore 110 through the slot 112 such that the digital light panel 36 is at least partially disposed within the bore 110.

As described above, the opening 38 defining the base pattern configuration 40 of the digital light panel 36 may vary for animating the predetermined illumination pattern 26. As shown in FIGS. 4-7, the digital light panel 36 may be movable relative to the housing 28 between at least two positions to vary the base pattern configuration 40. Moreover, the digital light panel 36 may be movable relative to the housing 28 between a plurality of positions. In one embodiment, the digital light panel 36 may be movable within the bore 110. In such an embodiment, the movement of the digital light panel 36 in the bore 110 facilitates the variations in the base pattern configuration 40.

The opening 38 may be further defined as a plurality of holes 122, with each of the holes 122 movable with the digital light panel 36 into alignment between the light module 34 and the aperture 32, and with the holes 122 independently defining the base pattern configuration 40 when aligned between the light module 34 and the aperture 32. Each of the holes 122 of the digital light panel 36 have the base pattern configuration 40 and permits the transmission of the light L therethrough. As such, the holes 122 are shaped such that the light L transmitted therethrough is similar to the predetermined illumination pattern 26 on the surface 22. It is to be appreciated that the digital light panel 36 may have a transparent or semi-transparent panel disposed within any of the holes 122. For example, the panel may be colored such that the light L transmitted through the panel takes on the colored properties of the panel which is then projected on the surface 22. It is to be appreciated that the holes 122 of the digital light panel 36 may be any suitable configuration for permitting the transmission of the light L therethrough in the base pattern configuration 40.

Because the holes 122 of the digital light panel 36 having the base pattern configuration 40 dictate the predetermined illumination pattern 26 on the surface 22, significant consideration is given to the shape, configuration, and orientation of the holes 122 relative to the housing 28 during the design of the illumination device 24. As shown in FIGS. 4-7, the holes 122 of the digital light panel 36 have a configuration reminiscent of a running horse. Furthermore, the image may be animated or dynamic such that the horse is viewed in the act of a gallop. It is to be appreciated that this configuration is for exemplary purposes only and differs from the star configuration of the predetermined illumination pattern 26 shown in FIGS. 2A and 2B. If the light L were emitted through the holes 22, the light L would project onto the surface 22 in a predetermined illumination pattern reminiscent of a running horse.

In addition, the orientation of the housing 28 relative to surface 22 (such as the rotational position of the housing 28 and the angle at which the light L is projected from the housing 28 onto the surface 22) is given consideration when designing the illumination system 20 to yield the desired predetermined illumination pattern 26. Furthermore, the effect that each of the condensing lens 68 and the objective lens arrangement 78 have on the light L as the light L projects from the light module 34 through the aperture 32 is also given consideration when determining the size, shape, configuration, and material of the condensing lens 68 and the objective lens arrangement 78.

The plurality of holes 122 may vary in configuration to vary the base configuration for animating the predetermined illumination pattern 26. Said differently, the plurality of holes 122 may progressively change in shape, size, orientation, etc., which correspondingly progressively changes the base pattern configuration 40, which in-turn progressively changes the predetermined illumination pattern 26.

Moreover, the digital light panel 36 may move to progressively position the plurality of holes 122 into alignment between the light module 34 and the aperture 32 to transmit the light L therethrough in the varying base pattern configuration 40. As noted above, changes to the predetermined illumination pattern 26 may be perceived by a person viewing the predetermined illumination pattern 26 as an animated or a dynamic image.

The movement of the digital light panel 36 may be further defined as rotation about an axis A substantially parallel to the alignment between the light module 34 and the aperture 32. The plurality of holes 122 may be positioned radially about the axis A. As such, the holes 122 may rotate about the axis A and progressively position into alignment between the light module 34 and the aperture 32. Therefore, rotation of the digital light panel 36 may facilitate animation of the predetermined illumination pattern 26.

As shown in FIGS. 4-7, the digital light panel 36 may be spaced from the printed circuit board 62. The illumination device 24 may further include an axle 123 extending from the printed circuit board 62 along the axis A to a distal end. The digital light panel 36 may be disposed on and rotatably coupled to the distal end of the axle 123. As such, the digital light panel 36 is rotatably coupled to the housing 28. It is to be appreciated that the digital light panel 36 may be rotatably coupled to the housing 28 in any suitable way.

As shown in FIGS. 4-6, the digital light panel 36 may have a substantially circular configuration centered about the axis A. It is to be appreciated that the digital light panel 36 may have any suitable configuration. Moreover, the digital light panel 36 may be movable within the slot 112. In one embodiment, the digital light panel 36 moves within the slot 112 as the digital light panel 36 rotates about the axis A. It is to be appreciated that the digital light panel 36 may move within the slot 112 in any suitable configuration.

As shown in FIGS. 4-7, the illumination device 24 may further include an indexing interface 124 that aligns the digital light panel 36 relative to the housing 28 for positioning the predetermined illumination pattern 26 on the surface 22. The alignment of the digital light panel 36 may refer to the positioning of the opening 38 relative to the housing 28 such that the light L exits the digital light panel 36 in the base pattern configuration 40, passes through the aperture 32, and is projected onto the surface 22 in the predetermined illumination pattern 26 with the predetermined illumination pattern 26 rotationally aligned on the surface 22 in a desired orientation. Moreover, the indexing interface 124 may include an indexer 126 adjacent the digital light panel 36 to reference the position of the digital light panel 36 relative to the housing 28 for timing the emission of the light L from the light module 34. The indexer 126 may extend from the printed circuit board 62 substantially parallel to the axle. The indexer 126 may have an indexing slot 128 with a portion of the digital light panel 36 disposed within the indexing slot 128. The digital light panel 36 may move within the indexing slot 128 and interface with the indexing slot 128. Said differently, the digital light panel 36 may have reference portions individually corresponding with the holes 122. The reference portions may selectively move through the indexing slot 128. When disposed in the indexing slot 128, the reference portions are recognized by the indexer 126. Recognition of the reference portion by the indexer 126 causes the light module 34 to emit the light L. The reference portions are oriented such that when the reference portions are recognized by the indexer 126, the corresponding holes 122 are aligned between the light module 34 and the aperture 32.

As shown in FIGS. 8-11, the digital light panel 36 may be fixed relative to the housing 28 and may selectively vary in transparency to vary the opening 38 which varies the base pattern configuration 40. In one embodiment, the digital light panel 36 extends through the slot 112 and is disposed in the bore 110. The digital light panel 36 is fixed to the frame 108, which fixes the digital light panel 36 relative to the housing 28. It is to be appreciated that the digital light panel 36 may be fixed relative to the housing 28 in any suitable manner.

The digital light panel 36 may have a selectively transparent portion 130 aligned between the light module 34 and the aperture 32. The selectively transparent portion 130 selectively varies in transparency to vary the opening 38 which defines the base pattern configuration 40. In one embodiment, the selectively transparent portion 130 selectively becomes opaque and defines a transparent or semi-transparent region, which is the opening 38 defining the base pattern configuration 40. The light L emitted may only transmit through the transparent or semi-transparent region, which transmits the base pattern configuration 40 through the aperture 32 and onto the surface 22 in the predetermined illumination pattern 26. The variations in the transparency of the selectively transparent portion 130 may refer to the selectively transparent portion 130 becoming opaque, transparent, or semi-transparent in varying regions to vary the opening 38 defining the base pattern configuration 40. The selectively transparent portion 130 may be colored such that the light L transmitted through the selectively transparent portion 130 takes on the colored properties of the selectively transparent portion 130, which is then projected on the surface 22. It is to be appreciated that the selectively transparent portion 130 may be any suitable configuration for transmitting light L therethrough in the base pattern configuration 40.

In one embodiment, the digital light panel 36 is a digital light panel varying in transparency. It is to be appreciated that the digital light panel 36 may vary in transparency in any suitable configuration.

Referring generally to the configurations shown in FIGS. 7 and 11, to project the light L on the surface 22 in the predetermined illumination pattern 26, the light source 64 of the light module 34 emits the light L in a plurality of directions. The light L transmits through the condensing lens 68 and is collimated such that the light L is substantially parallel. The light L transmits through the hole 122 of the digital light panel 36 aligned between the light module 34 and the aperture 32, as shown in FIG. 7, or through the selectively transparent portion 130 of the digital light panel 36, as shown in FIG. 11, and is configured into the base pattern configuration 40. The light L then transmits through the objective lens arrangement 78 where the light L is configured from the base pattern configuration 40 into the orientation that will be the predetermined illumination pattern 26. The light L then passes through the aperture 32 and is projected onto the surface 22 in the predetermined illumination pattern 26, as shown in FIG. 2A. The light source 64 of the light module 34 stops emitting the light L. The base configuration of the digital light panel 36 is varied by moving another one of the plurality of holes 122 into alignment between the light module 34 and the aperture 32 (in the embodiment shown in FIG. 7) or by varying the configuration of the selectively transparent portion 130 (in the embodiment shown in FIG. 11). The light L then transmits through the objective lens arrangement 78 where the light L is configured from the base pattern configuration 40 into the orientation that will be the predetermined illumination pattern 26. The light L then passes through the aperture 32 and is projected onto the surface 22 in the predetermined illumination pattern 26, as shown in FIG. 2B. The variations in the predetermined illumination pattern 26 may be viewed as an animated image. Moreover, those having ordinary skill in the art will appreciate that the illumination device of the present invention may be employed to project an image on a number of different surfaces both in the interior as well as the exterior of an automotive vehicle. Thus, the example illustrated in FIGS. 2A and 2B are merely representative of one operative application for the illumination device of the present invention. Examples of other applications and locations are almost limitless. For example, the illumination device of the present invention may be employed in conjunction with a side mirror or front and/or rear bumper to project an image, either still, animated, or dynamic, on the surface located below the side mirror and bumper.

In this way, the present invention reduces the cost of manufacturing the illumination systems 20 of the vehicle. Specifically, the light L may be projected onto any surface 22. As such, the surface 22 is not required to be a particular material having specific transparency properties to allow for light to be projected therethrough from behind the surface 22. Furthermore, the present invention allows for the aftermarket application of the illumination device 24 in that the illumination device 24 may be mounted to project the light L onto the surface 22. It will be appreciated that the present invention is compatible with and can be incorporated modularly into a number of different types of applications within vehicles without necessitating significant changes to existing manufacturing equipment and/or tooling.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. An illumination device for projecting light in a predetermined illumination pattern on a surface, said illumination device comprising:
   a housing having a cavity and an a aperture that opens into said cavity;
   a light module operatively attached to said housing for selectively emitting the light into said cavity; and
   a digital light panel at least partially disposed in said cavity between said light module and said aperture and having at least one opening defining a base pattern configuration corresponding to the predetermined illumination pattern for aligning the light emitted said light module through said opening into said base pattern configuration and subsequently projecting the light through said aperture onto the surface in the predetermined illumination pattern.

2. The illumination device as set forth in claim 1 further including an indexing interface that aligns said digital light panel relative to said housing for positioning the predetermined illumination pattern on the surface.

3. The illumination device as set forth in claim 1 further including an objective lens arrangement disposed between said digital light panel and said aperture for transforming the light from the base pattern configuration into the predetermined illumination pattern.

4. The illumination device as set forth in claim 3 wherein said objective lens arrangement includes a first lens and a second lens with said first lens disposed between said light module and second lens.

5. The illumination device as set forth in claim 4 wherein said first lens has first and second surfaces spaced from one another and said second lens has first and second surfaces spaced from one another with said first surface of said first lens facing said light module, said second surface of said second lens facing said aperture, and with said second surface of said first lens and said first surface of said second lens facing one another.

6. The illumination device as set forth in claim 5 wherein each of said first and second surfaces of said first and second lenses are curved with each surface having a radius.

7. The illumination device as set forth in claim 1 further including a condensing lens disposed between said light module and said digital light panel for collimating the light emitted from said light module toward said digital light panel.

8. The illumination device as set forth in claim 7 further including a spacer having an annual configuration and disposed between light module and said condensing lens for guiding the light into the condensing lens.

9. The illumination devise as set forth in claim 1 wherein said light module includes a semi-conductor light source.

10. The illumination device as set forth in claim 1 wherein said light module includes a printed circuit board supporting a light source and coupled to said housing.

11. The illumination device as set forth in claim 1 wherein said housing has a first section with said first section having said aperture.

12. The illumination device as set forth in claim 1 further including a frame fixed to said housing and having a bore extended there through, with said bore aligned with said aperture and said light module, and said digital light panel at least partially disposed within said bore.

13. The illuminating device as set forth in claim 12 said digital light is moveable within the bore.

14. The illumination device as set forth in claim 12 said frame has a slot transverse to said bore and opening into said bore with said digital light panel extending into said bore through said slot.

15. The illumination devise as set forth in claim 14 further including an objective lens arrangement disposed within said bore between said slot and said aperture and coupled to said frame to fix said objective lens arrangement to said housing.

16. The illumination device as set forth in claim 14 further including a condensing lens disposed within said bore between said slot and said light module and coupled to said frame to fix said condensing lens to said housing.

17. The illumination devise as set forth in claim 1 wherein said digital light panel is movable relative to said housing between at least two positions to vary said base pattern configuration.

18. The illumination device as set forth in claim 17 wherein said opening is further defined as a plurality of voids, with each of said voids moveable with said digital light panel into alignment between said light module and said aperture, and with said voids independently defining said base pattern configuration when aligned between said light module and said aperture.

19. The Illumination device as set forth in claim 17 further including an indexing interface that aligns said digital light panel relative to said housing for positioning the predetermined pattern on the surface.

20. An illumination system comprising:
   a surface; and
   an illumination device comprising:
   a housing having a cavity and an aperture that opens into said cavity;
   a light module operatively attached to said housing and selectively emitting light into said cavity; and
   a digital light panel at least partially disposed in said cavity between said light module and said aperture and having at least one opening defining a base pattern configuration corresponding to a predetermined illumination pattern on said surface, said digital light panel aligning said light emitted from said light module through said opening into said base pattern configuration and subsequently projecting said light through said aperture onto said surface in said predetermined illumination pattern.

* * * * *